W. C. DAYTON.
LIQUID FUEL BURNER AND SYSTEM EMPLOYING THE SAME.
APPLICATION FILED MAR. 21, 1921.

1,409,678. Patented Mar. 14, 1922.
7 SHEETS—SHEET 1.

INVENTOR
Walter C. Dayton
BY
Edwin A. Packard
HIS ATTORNEY

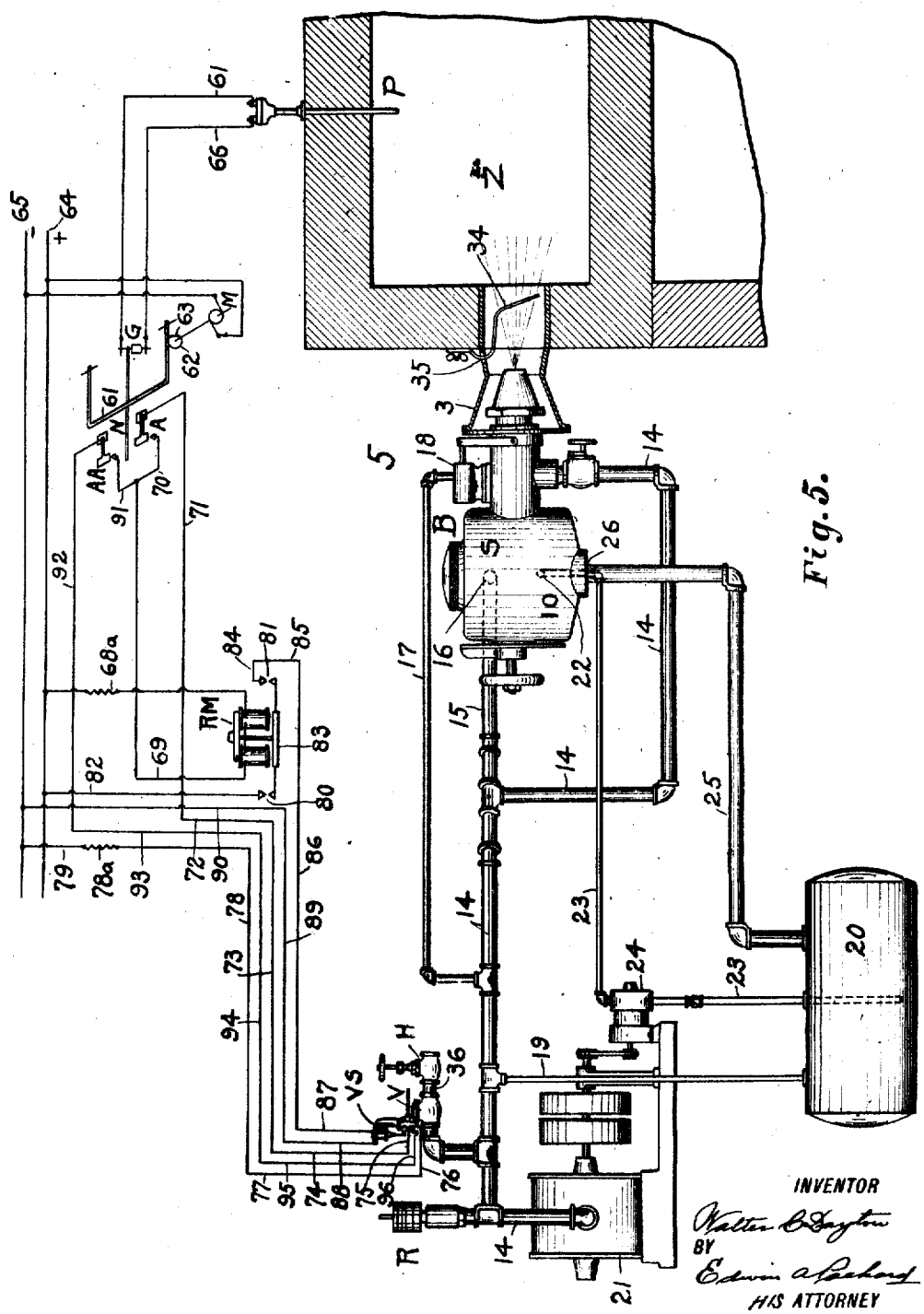

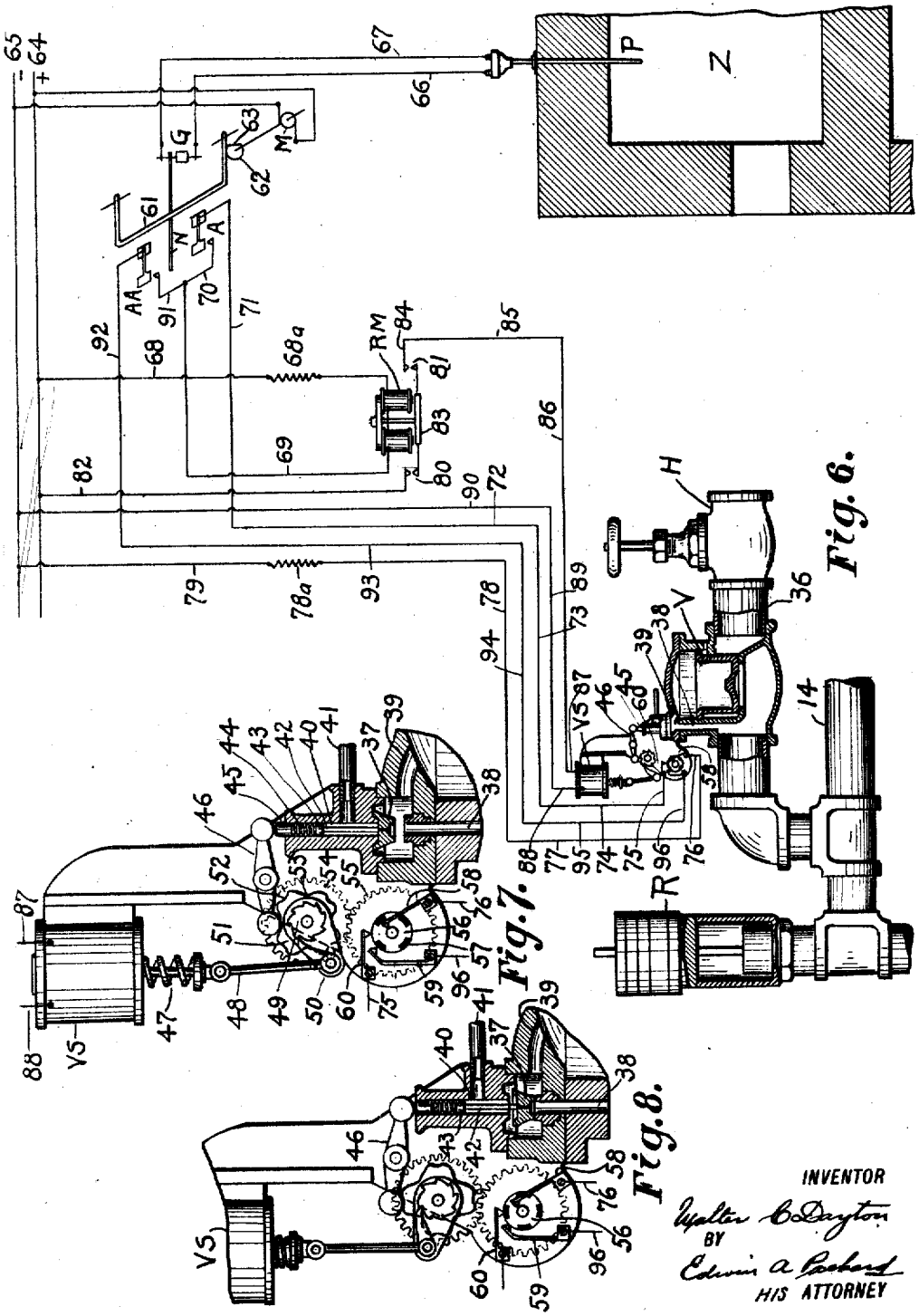

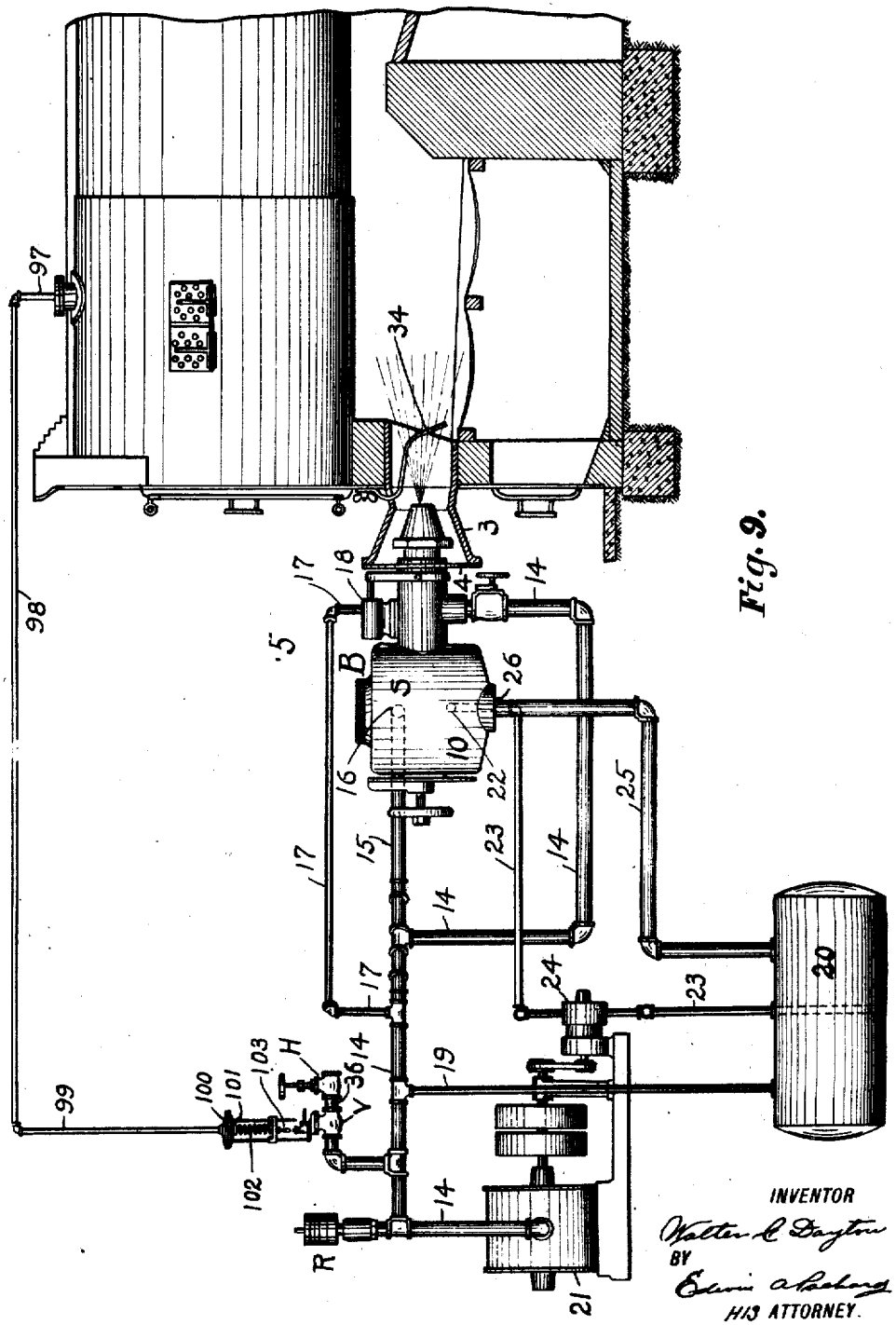

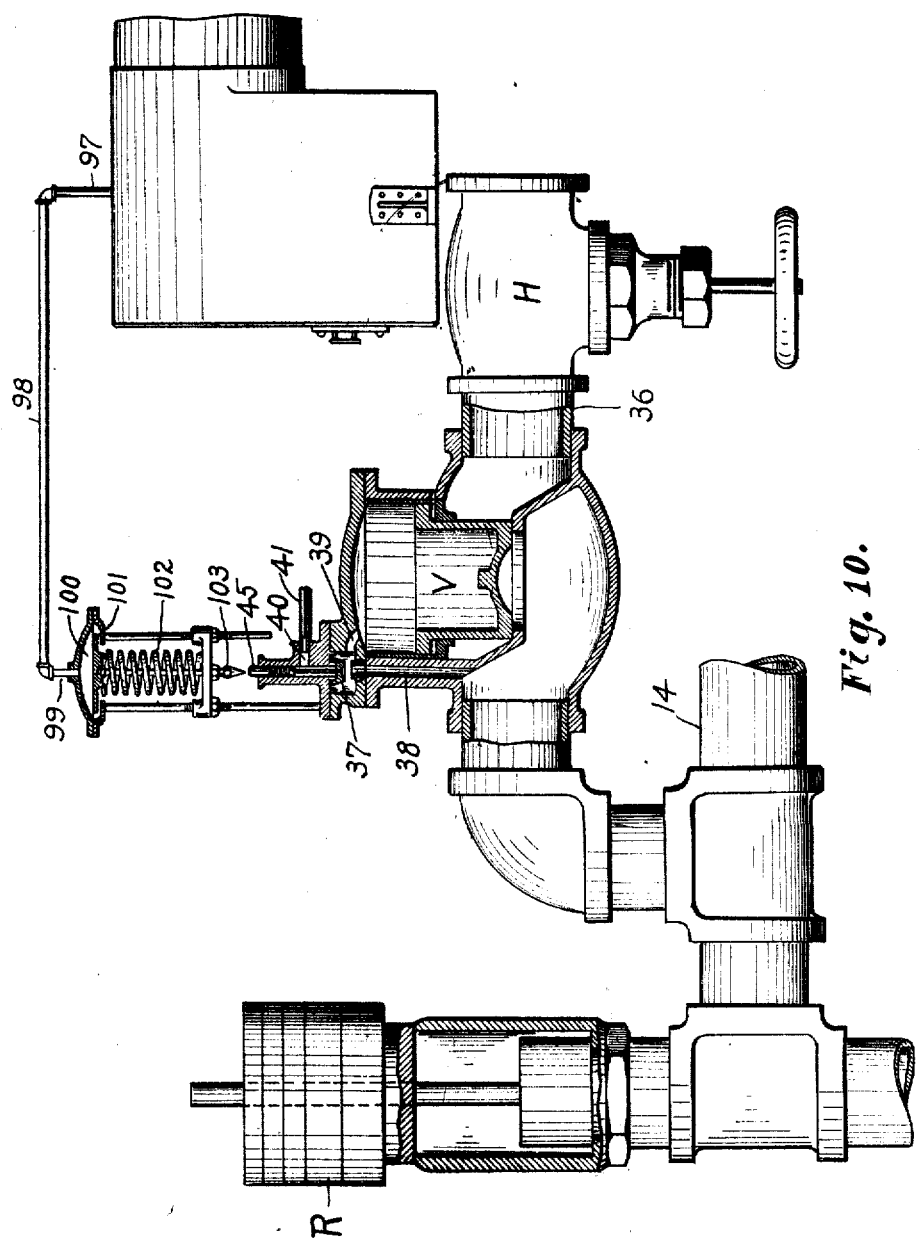

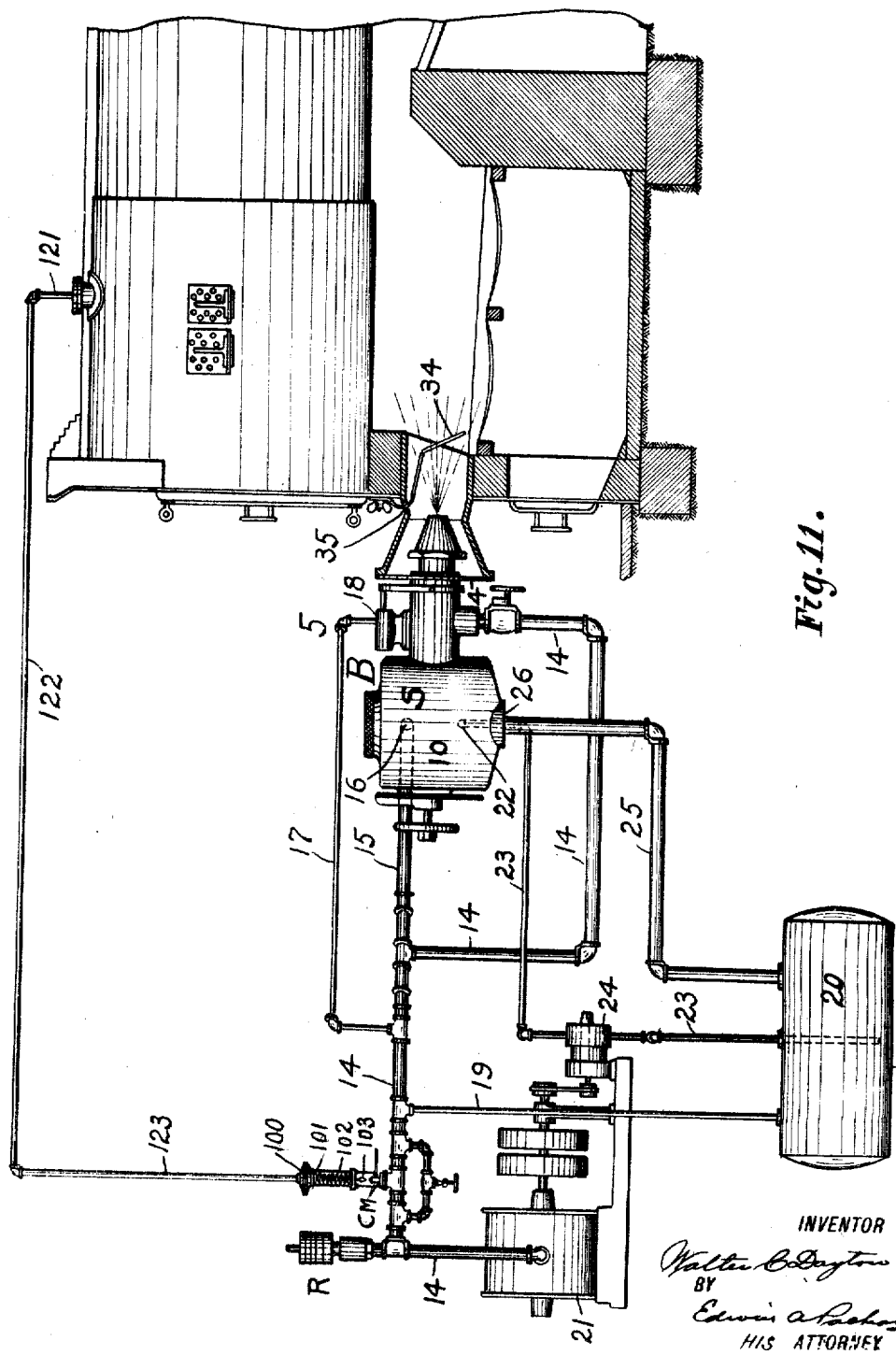

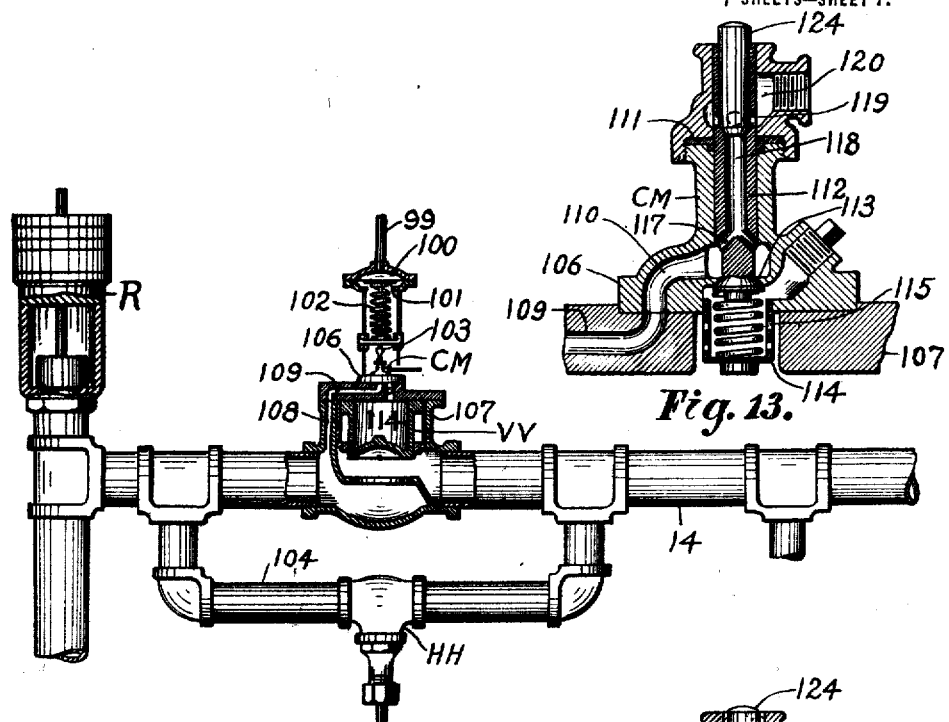
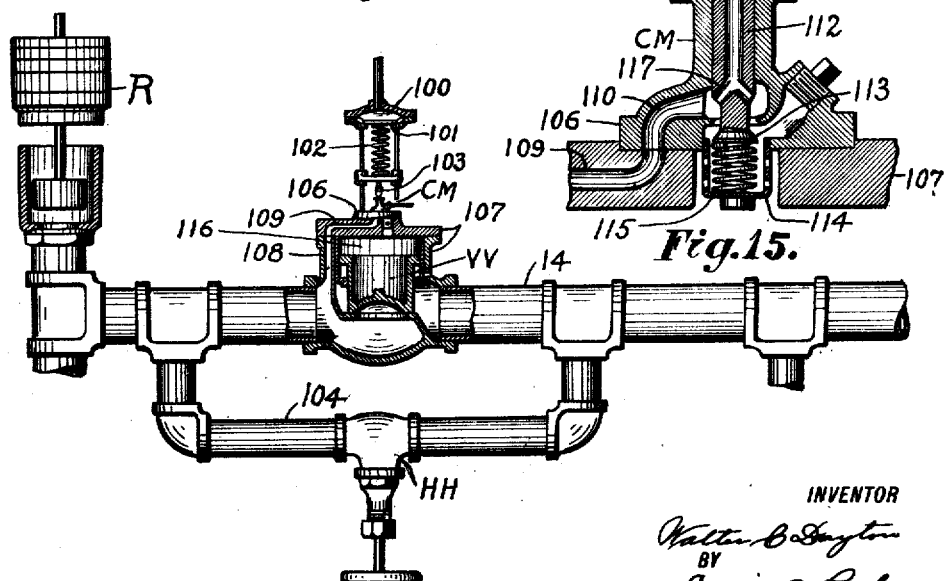

UNITED STATES PATENT OFFICE.

WALTER C. DAYTON, OF RUTHERFORD, NEW JERSEY, ASSIGNOR TO GENERAL OIL GAS CORPORATION, OF BRISTOL, VIRGINIA, A CORPORATION OF VIRGINIA.

LIQUID-FUEL BURNER AND SYSTEM EMPLOYING THE SAME.

1,409,678.   Specification of Letters Patent.   Patented Mar. 14, 1922.

Application filed March 21, 1921. Serial No. 454,004.

*To all whom it may concern:*

Be it known that I, WALTER C. DAYTON, a citizen of the United States, and a resident of Rutherford, in the county of Bergen and State of New Jersey, have made certain new and useful Improvements in Liquid-Fuel Burners and Systems Employing the Same, of which the following is a specification.

In United States Letters Patent No. 1,174,970 and No. 1,174,971, granted Mar. 14, 1916, there is shown and described a mixing means whereby a combustible—liquid hydrocarbon, to wit, oil—and a combustion supporting gas—to wit, air—are brought into intimate contact with each other and are mixed together in a constant ratio even under varying conditions of the flow of the combustion supporting gas resulting from variations in pressure. According to the construction of the mixing device of either of said patents the oil and air can be mixed at practically any desired ratio—in other words, the ratio is subject to regulation or change as desired—but the ratio when once established can be maintained indefinitely.

The present invention contemplates the employment of a mixing device such as above referred to with certain instrumentalities used in conjunction therewith or applied thereto, whereby the fields of usefulness of this mixing device are broadened or extended or whereby its usefulness in certain fields is enhanced.

The present invention also contemplates the employment of the mixing device as constituting a part of a burner wherein or whereby a definite character of combustion (preferably a complete combustion) between air and oil is enabled to be maintained.

According to the preferred embodiment of the invention the mixing device for the air and oil terminates with a nozzle or atomizing device that enters a surrounding tube or casing member constituting a restricted throat into which air from the outside enters and flows to a position where the air mixes with or unites with a spray of mixed air and oil—the air and atomized oil—from the mixing device. The mixing device and the surrounding tube or restricted throat member are brought into operative relation and there is employed in combination therewith, a damper which is automatically operated in accordance with the variations in pressure of air flowing to the mixing device in order to control the flow of outside air into the surrounding tube or throat member. The means for automatically operating the damper is described herein and is frequently referred to as damper controlling means.

The invention particularly relates to a system or arrangement of cooperatively related parts wherein the improved burner is included and wherein the pressure of the air delivered to the mixer is caused to vary, dependent upon thermal conditions or upon pressure conditions resulting from the functioning of the burner. In other words, the burner is incorporated in a system (a), wherein, as in one type of system, the burner heats a certain part or heats members in a certain locality up to a predetermined temperature and then means, dependent for its operation upon a temperature function, comes into play to effect a reduction—variation—in the pressure of the air supply to the burner whereby the heating effect of the burner is caused to be cut down; or, (b) wherein, as in another type of system, the burner heats up to a certain point a boiler or other piece of apparatus having a pressure function inherent thereto and whereupon means, dependent for its operation upon a pressure function, comes into play to effect a reduction—variation—in the pressure of the air supplied to the burner whereby the heating effect of the burner is caused to be cut down.

The invention also relates to a construction or to constructions functioning as hereinoutlined and also to certain features of construction and to arrangement and construction of parts of the apparatus or burner herein fully set forth and described.

As showing certain specific embodiments of systems or apparatus wherein the invention is realized, reference is made to the accompanying drawings forming a part of this specification and in which drawings, Figure 1 is a vertical sectional view of the improved burner in which a mixing device is employed in conjunction with a restricted throat member providing a tube that surrounds a nozzle at the delivery end of the mixing device. In this figure there is also shown a damper—closed—which is operatively positioned by an air controlled piston working in a cylinder and against a compression spring, which piston and cylinder constitute a part of an automatic, air operated, damper-controlling means.

Figure 4:
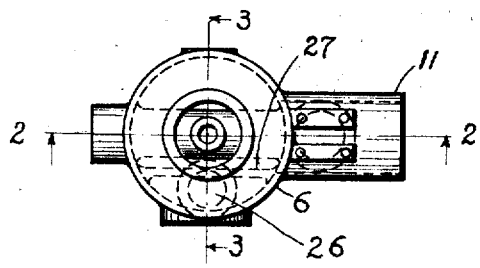
Figure 4 is a plan view of the member shown in Figures 2 and 3.

Figure 5 is a diagrammatic view illustrating the manner of installing the improved burner—comprehending parts of the mixing device, the damper and its associated air-operated damper-controlling means—in an apparatus or system wherein the air supplied to the mixing device and damper-controlling means of the burner can be varied by means dependent for its operation upon a temperature function of that which is heated by the burner; the particular means being dependent upon a pyrometer or the like having a thermal element located in the zone heated by the burner.

Figures 6, 7 and 8 are views, each partially in section, showing some of the parts at a larger scale and more clearly than they appear in Figure 5.

Figure 9 is a diagrammatic view illustrating the manner of installing the improved burner in an apparatus or system whereby the air supplied to the mixing device and damper-controlling means can be varied by means dependent for its operation upon a pressure function of the member heated by the burner.

Figure 10 is a view partially in section showing some of the parts at a larger scale and more clearly than they appear in Figure 9.

The apparatus of Figure 6 and the apparatus of Figure 9 are similar in that the variations and more specifically the reduction in pressure of the air takes place in a main leading to the burner and branching to the damper-controlling means; the reduction is effected by bleeding into the atmosphere or, in other words, by opening a branch leading from the main to the atmosphere. This is accomplished in the case of the apparatus of Figure 6 by a valve under the indirect control of a pyrometer that extends into the zone heated by the burner; or, as in the case of the apparatus of Figure 9 by a valve which is under the indirect control of the boiler pressure due to a pipe leading from the boiler. In the one case the valve bleeds a main when the temperature rises to a certain point and in the other case the valve bleeds the main when the pressure reaches a predetermined amount.

Figure 11 is a diagrammatic view illustrating the improved burner in an apparatus or system wherein the air supplied to the mixing device and damper - controlling means can be varied by means dependent for its operation upon a pressure function of that member which is heated by the burner.

Figures 12, 13, 14 and 15 are views, each partially in section, showing some of the parts and at a larger scale and more clearly than they appear in Figure 11.

The apparatus of Figures 11 to 15 is similar to the apparatus of Figure 9 in that each apparatus in functioning avails itself of the pressure function of that which is heated in order to vary the pressure of the air supplied to the mixing device and to the damper-controlling means associated with said mixing device. The apparatus of Figures 11 to 15, however, effects a reduction of pressure flowing through and from the main and its branches by a valve which is positioned in a manner to, in effect, throttle the main; this being done by closing the valve and thus closing the main but with such construction the valve is by-passed by a small pipe which always remains open to some extent so that the burner will continue to function, but only to a small extent.

Reference will now be made to the drawings in detail.

*Construction of the burner and its connections in the systems illustrated.*

Figure 1:
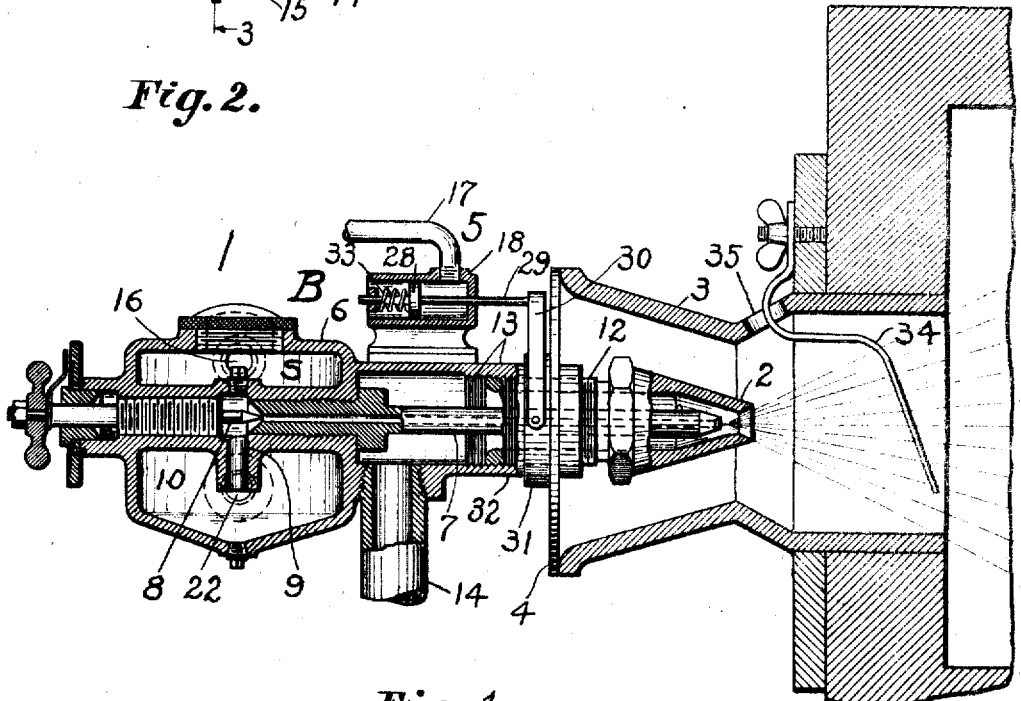

The burner is shown in section in Figure 1 and is designated by reference character B. It is shown connected up and in place in Figure 5, in Figure 9 and in Figure 11. In Figure 1 it will be seen that 1 designates a mixing device as a whole which terminates with or in a nozzle 2. This mixing device is constructed and arranged so that it delivers a mixture of properly proportioned air and oil, or more broadly stated a mixture of proportioned combustible-supporting gas and a liquid combustible, into a surrounding tube or restricted throat member 3 into which the mixture passes. This member 3 is sometimes referred to as an outer casing member providing a throat. The mixing device embodies the features of construction of the mixing device shown and described in the aforesaid Patents No. 1,174,970 and No. 1,174,971. There is in association with the mixing device and the throat member a movable damper 4 controlled as to its position by the damper operating or damper positioning means 5. This means is automatically under the control of the air and is frequently referred to as the automatic damper-controlling means. Said means 5 is constructed so that it is connected in the system employing this burner in such a manner that the position of the damper is dependent upon the pressure of the air flowing into the mixing device, as will hereinafter appear, with the result that the proper volume of secondary or induced air is caused to enter the throat member and mingle with mixed air and oil flowing from the nozzle 2 of the mixing device 1 whereby the proper amount of induced air will be supplied for the proper supporting of the desired—complete—combustion.

Figure 3:
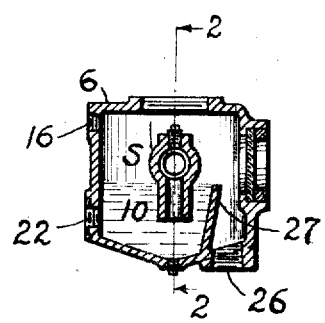
Figure 3 is a vertical transverse sectional view of this same member and is a view taken as on the plane indicated by the line 3—3 of Figure 2 or 3—3 of Figure 4 looking in the direction of the arrows.
Figure 2:
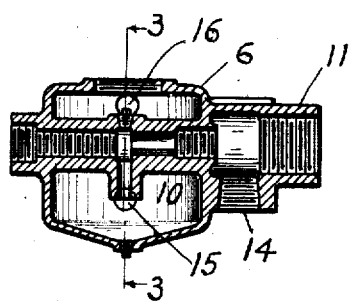
Figure 2 is a vertical longitudinal sectional view of the main or body member of the mixing device and is a view taken as on the plane indicated by the line 2—2 of Figure 3 or 2—2 of Figure 4.

The mixing device 1 has a main or body member 6 which is shown more fully in Figures 2, 3 and 4. This body member carries what is sometimes referred to as an ejector tube 7. The area of the orifice or entrance to the inlet end of this tube is controlled by a hand-positioned valve 8; that is, this valve 8 provides means for regulating the opening of a restricted inlet passageway which is in a conduit 9 leading from a reservoir 10, provided in the main or body member 6, to the inlet end of the ejector tube 7. The reservoir 10 is enclosed within the body member wherein there is provided the space or chamber S (see particularly Figure 3) above the reservoir. The main or body member 6 also has a tubular portion 11 that carries a member 12 which includes or provides the nozzle 2. The tubular portion 11 and the member 12 collectively provide an outer piping 13 which surrounds, extends along and beyond the ejector tube 7. The ejector tube 7 and surrounding piping or conduit 13 and the intimately associated parts may together be broadly considered as the mixing device proper for air and oil and functions as an atomizing device. A main air pipe or conduit 14 is in communication with the interior of the piping 13, as is manifest from Figure 1 and an inspection of either Figure 5, Figure 9 or Figure 11. Each of the last-mentioned figures shows three branches extending from the main air pipe 14; such branches as pipe 15 in communication through the air inlet opening 16 with the space or chamber S above the reservoir 10 of the mixing device, pipe 17 in communication with the interior of the cylinder 18 of the damper-controlling means 5 and pipe 19 in communication with the interior of a closed fuel supply tank 20, frequently referred to as the main supply tank.

Air is supplied under pressure to the main air pipe 14 by means of the air pump or air compressor 21. The main air pipe 14 of each system illustrated, be it the system of Figures 5, 9 or 11, has associated therewith or therein means for varying the effective air pressure in said pipe. The construction of the means whereby this is accomplished will hereinafter be described.

In the operation of the mixing device air is supplied under pressure from the main air pipe 14, flows along outer pipe 13 (see Figure 1) and ultimately from the nozzle 2 at the delivery end of said outer piping 13. The air in its flow passes the delivery end of the ejector pipe or tube 7. It creates a suction or causes a drop in pressure at said end with the result that the liquid fuel—oil—is drawn from or forced from the reservoir 10, passes through conduit 9 through the restricted orifice that is controlled or regulated by valve 8 and into and through the ejector tube 7 from which fuel is delivered in atomized form and in a manner whereby it mixes with the air flowing through pipe 13 in the desired ratio or proportion. Here it will be noted that the mixing device as a whole comprehends the reservoir 10 into which oil is fed through an oil inlet opening 22.

In the installing of the burner illustrated in Figure 1, in systems such as diagrammatically illustrated in Figures 5, 9 and 11, the construction is such that the oil is fed into reservoir 10 from the closed tank 20 through oil piping 23, being sucked and forced through said piping by oil pump 24. An oil return pipe 25, frequently referred to as an over-flow pipe, extends from the oil return opening 26 of the main or body member 6 and leads back to the fuel supply tank 20.

From Figures 3 and 4 it will be observed that the reservoir 10 is provided with a dam 27 whereby the oil in said reservoir will be maintained at a constant level. The oil which is supplied through oil piping 23 is in excess of the amount used in the mixing device and such excess flows over dam 27 and is returned to tank 20 by overflow pipe 25; the dam is in effect a continuance of the overflow pipe. The dam or the overflow piping may be referred to as means for maintaining constant the level of the surface of the liquid within the reservoir and this level is substantially level with the entrance of the ejector tube 7, said surface of the liquid being only slightly below the entrance end of said tube, as will be seen from the drawings. The result of the construction just described is that oil is delivered so close to the inlet of the mixing device proper that fluctuations of delivery, due to friction and inertia, are substantially absent.

From the preceding description it will be manifest that the mixing device is connected up in each instance in a relatively closed system. It has also been pointed out how branch pipe 17 leads from the main air pipe 14 to the damper-controlling means 5 relied upon to position the damper 4. In each of the systems shown there is provided a relief valve R, the function of which is to allow a release of air in case the pressure within the main air pipe 14 reaches a predetermined amount.

There will now be described the construction of the particular damper 4 and controlling means 5 therefor. Said means 5 includes the cylinder 18 within which a piston 28 fits and slides, said piston being connected by rod 29 and yoke 30 to the damper 4. The damper is constructed so that it has a central annular bearing member 31 that slides upon the outer portion 32 of piping 13 of the mixing device. The damper-positioning and controlling means 5 has a compression spring 33 normally pressing the piston in a direction tending to force the damper to or toward closed position and the air supplied under pressure through the branch pipe 17 forces the piston 28 against the pressure of this spring and in a direction to open and hold open the damper. It will be manifest that as the air pressure increases the piston 28 is forced rearwardly to further press the spring with the result that damper 4 moves from closed position to an open position or from an open position, if the damper is already open, to a still further or greater open position.

The construction of the mixing device described herein and as described in the aforesaid patents is such that a predetermined ratio of proportioned air and combustible can be maintained for an indefinite period of time, even at varying air pressures. The greater the air pressure the greater the flow of air and the greater the amount of combustible that is supplied to or mixed with the air. In other words, while the proportion of air and combustible is maintained constant the amount of air and of combustible delivered from the mixing device varies, with varying pressures; the greater the air pressure the greater the amount of mixed air and fuel delivered.

The present invention involves an apparatus whereby, when the mixture from the mixing device is intended for certain combustion, a desired amount of air from the outside is brought into association with the mixture whereby the desired—complete—combustion can take place. The control of this induced air is effected, as previously indicated, by introducing the mixture from the mixing device 1 into a surrounding tube or throat member 3 by controlling the flow of air induced or sucked from the outside into the throat member by means of the damper 4 and, further, by providing means whereby the position of the damper is dependent upon the pressure of the air flowing to the mixing device or whereby in other words the position of the damper becomes a function of the pressure of the air supplied to the mixing device; or, becomes a function of the amount of mixed air and fuel delivered from the mixing device and fed into the throat member 3.

In order to assist in the igniting of the mixed air and oil there is provided a bent baffle plate 34 which can be temporarily introduced in the throat through an opening 35 so as to retard or baffle the inflow of the mixed air and oil until ignition is fully established; thereafter, this baffle plate 34 can be withdrawn and the hole or opening 35 may be plugged.

The structure previously described constitutes or provides what may be considered as a fuel mixer and burning device and is particularly useful as a burner for general application and especially where complete and efficient combustion is desired.

There will now be taken up in order each of the systems or arrangements of Figures 5, 9 and 11.

*System of Figure 5*, (including Figures 6, 7 and 8.)

Here the burner is employed in an arrangement for heating an oven, furnace or the like and in the region or zone Z heated there is inserted a thermal element P of a pyrometer or the like that indirectly controls the opening and closing of valve V which in turn functions to open a branch or bleeder pipe 36 leading from the main air pipe 14 to the atmosphere when the zone Z becomes heated to a certain predetermined temperature; or, thereafter, to close the branch or bleeder pipe 36 as soon as the heat in the zone Z drops to or below a certain predetermined temperature. Such movement of the valve is accomplished by the pyrometer and means associated therewith, as will hereinafter appear.

When the valve B is open it permits an escape of air to the atmosphere, a consequent reduction of the air pressure within the main air pipe 14, and the consequent cutting down of the heating effect of the burner B. The bleeder pipe 36 may be provided with a hand-operated valve H which can be adjusted to control the outflow through the bleeder pipe, even when the valve V is open. The valve V remains open, as just indicated, until the temperature within zone Z has dropped to a predetermined degree and again the pyrometer and associated means come into play to effect a closing of the valve, with a consequent result that a further escape of air from the main air pipe 14, through branch or bleeder pipe 36, is cut off and the full pressure of air in the main air pipe again becomes available to operate the burner to full capacity. The means whereby valve V is under the control of the pyrometer is as follows, the valve construction being first described.

When the valve V and associated mechanism is closed the parts occupy the position shown in Figures 6 and 7. In said figures it will be noted that an auxiliary valve 37 is in an open or elevated position permitting air from the main air pipe 14 to pass through small passageways 38 and 39 and exert its full pressure on the larger face or rear side of the valve V, which is a differential valve, thus forcing said valve V to assume and remain in closed position. When auxiliary valve 37 is in the elevated position shown in Figure 7 a small passageway provided as at 40 and 41 is closed by the auxiliary valve. This auxiliary valve has a stem 42 with a shoulder 43 thereupon engaged by one end of a compression spring 44. The upper end of the compression spring is engaged by a sliding pin 45 that can be pushed downwardly by a pivoted lever 46. This lever 46 is actuated each time a solenoid VS is energized. This solenoid may be referred to as the valve-controlling solenoid. The mechanism whereby this is accomplished includes solenoid core 47, link 48, ratchet and pawl mechanism 49 and 50, and the cam 51 having sets of elevated dwells 52 and of depressed dwells 53. The elevated dwells and depressed dwells alternate. When the parts are in the position shown in Figure 7 and the solenoid is energized it effects a movement of the cam whereby the pivoted lever 46 causes a depression of auxiliary valve 37, a consequent closing or shutting off of the passageway 38 and an opening of the passageway 40 whereby a passageway is established through 39, 40 and 41 (see Figure 8), with the result that the pressure at the rear or larger face of the differential valve V is released, allowing said valve to open to bleed the main air pipe 14. There is operatively connected with cam 51 a gear 54 meshing with gear 55 and connected with said gear 55 is a contact make and break member 56 having four spaced insulating portions 57, the number of these insulating portions corresponding to the number of the elevated dwells. Associated with this contact make and break member 56 is a ground contact 58 and two other make and break contacts 59 and 60. The contacts 59 and 60 are arranged so that when one of them is in electrical engagement with member 56, the other is out of electrical engagement with said member because of its engagement with one of the insulating portions 57. In Figure 7, it will be noted, that contact 60 is in electrical engagement with the make and break member 56 while contact 59 is prevented from such electrical engagement by one of the insulating portions 57. On the other hand, in Figure 8 it will be observed that a reverse arrangement can exist. The electrical arrangement whereby the solenoid is energized will now be described:—

The electrical system within which the solenoid VS is included also has a relay magnet RM, a needle galvanometer G and mechanism whereby a motor M effects a periodical depression of the needle N of the galvanometer. With normal conditions existing the periodical depression of the needle does not effect any closing of any of the electrical circuits. However, the electrical wiring is such that when the temperature in the zone being heated rises to a certain point the needle will be moved in position whereby there can be effected a closing of one switch A, or when the temperature drops to a certain point the needle will be moved in position whereby there can be effected a closing of another switch AA. The periodical depression of the needle (say every 5 minutes) is effected by a U-shaped depressing member 61 which is held in its elevated or inoperative position by a cam 62, excepting when dwell 63 of the cam permits the depressing member 61 to drop for the purpose of depressing the needle N and the consequent closing of switch A or AA when the needle N is directly over either of the switches. The cam 62 is operated in any suitable manner from motor M that receives its energy from any suitable source of power, as from supply wires 64 and 65. The poles of the galvanometer G are connected to the poles of the thermal element P of the pyrometer or the like by wires 66 and 67. The pyrometer includes the thermal element P, galvanometer G, and the electrical connections between them.

Assuming that the system as a whole is normally functioning, that is with the differential valve V closed and with the parts controlling the valve occupying the position shown in Figure 7, but that the temperature in zone Z has just risen to a point where the next depression of the needle N will effect a closing of switch A, then the circuit established by the closing of switch A is as follows:—from supply wire 64, over or through the following-wire 68, resistance 68ª, coils of relay magnet RM, wires 69 and 70, switch A, wires 71, 72, 73, 74, 75 (pass from Figure 5 or Figure 6 to Figure 7), contact 60, contact make and break member 56, ground contact 58, wire 76 (pass from Figure 7 to Figure 5 or Figure 6), wires 77 and 78, resistance 78ª, wire 79 to supply wire 65. There is thus established a circuit that includes the relay magnet RM, energizing said relay magnet, effecting a consequent closing thereby of switches at 80 and 81 and completing the following circuit:—leading from supply wire 64, through and over wire 82, switch 80, movable armature 83, switch 81, wires 84, 85, 86, 87, coil of the solenoid VS (see Fig. 7), wires 88, 89, 90 to wire 65. Thus, it will be observed that there is a simultaneous energizing of the coils in relay magnet RM and in the coil of the solenoid VS. Each of these circuits when once established remains completed, assuming the needle N to be held depressed a sufficient length of time to accomplish this, until the solenoid VS functions to lift the core 47 thereof and effect a moving of the cam 51 to a new position and also a turning of the make and break member 56 until one of the insulating portions 57 comes under the contact 60 (as shown in Figure 8) thus disrupting the circuit that includes the relay magnet RM. The disrupting of this circuit causes the de-energizing of the magnet RN and a consequent breaking of the circuit that includes the coil of the valve controlling solenoid VS, due to the dropping of the armature 83 and the breaking of the switches 80 and 81.

It will be remarked that the needle N is held depressed to maintain switch A closed during the entire period while the relay magnet RM and the coil of the solenoid VS was functioning as above described. The subsequent repeated periodical depressions of the needle N, even though at times it may close switch A, will not effect any closing of the circuits until the temperature in the zone being heated is dropped sufficiently to throw the galvanometer needle N to a position where it will close the switch AA. Assuming the zone being heated cools to the point where the needle N is in a position in which the next depression thereof will effect a closing of the switch AA, and assuming that the U-shaped member 61 has just dropped to effect the closing of this switch, then the circuit which is completed and which includes the relay magnet RM is as follows:—

From supply wire 64, through and over wire 68, resistance 68ª, coils of the relay magnet RM, wires 69 and 91, switch AA, wires 92, 93, 94, 95, 96 (see Fig. 8), contact 59, make and break member 56, ground contact 58, wire 76 (now pass to Figure 5 or Figure 6), wires 77 and 78, resistance 78ª, wire 79 to supply wire 65. This effects an energizing of the relay magnet RM and a consequent closing of the switches to 80 and 81, thus again completing the previously described circuit that includes the coil of the valve-controlling solenoid VS. The energizing of the solenoid VS at this time effects a movement of the parts from the position shown in Figure 8 to the position shown in Figure 7 and a consequent interruption of the circuit which includes contact 59, due to one of the insulating portions 57 coming into engagement therewith, as shown in Figure 7.

From what has preceded, assuming the system to be functioning normally, it will be observed that when the temperature of the zone Z becomes sufficiently high the needle N swings over switch A, one of its periodical depressions effects the closing of the switch, and a consequent moving of the parts controlled by the solenoid VS to the position shown in Figure 8; and this is followed by an opening of the valve V and a consequent bleeding of air from the main air pipe 14. This continues until the temperature in zone Z drops to a point where the needle N of the galvanometer comes over the switch AA and the following periodic depression of the needle effects, by means of solenoid VS, a moving of the parts actuated thereby from the position shown in Figure 8 to the position shown in Figure 7. This is followed by a closing of the valve V that prevents any further escape or bleeding of air from the main air pipe 14 and the apparatus reassumes its normal functioning. It will thus be noted that the pyrometer P and parts controlled thereby for positioning the valve V may broadly be referred to as valve-controlling means and that said means in conjunction with the valve may collectively be referred to as means for varying the pressure of air in the main air pipe 14. Furthermore, this last-mentioned means may be referred to as means depending for its operation upon a function—a temperature function—of that which is heated by the burner.

*System of Figure 9* (including Figure 10.)

The apparatus of this system employs a differential valve V which is similar in construction and functions in substantially the same manner as valve V of the apparatus of Figure 5. As a matter of fact valve V is controlled by auxiliary valve 37 which controls the closing and opening of the passageways 38, 39, 40 and 41 previously described and therefore further description of this valve is unnecessary at this time. It will be observed, however, that the burner of the system of Figure 9 is employed for the heating of a boiler and that from the boiler a pipe line comprising pipes 97, 98 and 99 extends to a chamber 100 which has a flexible diaphragm 101 defining one side thereof (see particularly Figure 10). This diaphragm is normally pressed upwardly by means of a compression spring 102 and there is connected to said diaphragm a press-rod 103. When the boiler is functioning normally, that is when the boiler pressure has not reached a predetermined abnormal amount, the pressure of the compression spring 102 maintains the diaphragm 101 and press-rod 103 in an elevated position against the pressure of the boiler with the result that the auxiliary valve 37 remains open and the valve V remains closed. When, however, the pressure of the boiler reaches the amount which is predetermined as abnormal then the pressure of the boiler overcomes the pressure of the spring 102, forces the diaphragm 101 downwardly a sufficient distance whereby the press-rod 103 presses downwardly against the sliding pin 45 thus effecting a downward movement of the auxiliary valve 37 to shut off passageway 38, with the result that valve V can open and permit a bleeding of the air from the main air pipe 14. It will thus be noted that in the system of Figures 9 and 10 the control of the valve V is dependent upon a function—pressure function—of the boiler or other apparatus being heated by the burner, except as indicated, the apparatus of Figure 9 functions practically the same as the apparatus of Figure 5.

*System of Figure 11,* (including Figures 12 to 15.)

The apparatus of this system employs a differential valve VV that has been established in the main air pipe 14; the valve VV, however, is open as shown in Figure 12 when the apparatus is functioning normally. If, however, the pressure within the boiler or other apparatus being heated approaches a predetermined amount which may be considered as abnormal, then the valve VV is caused to assume its closed position, as shown in Figure 14, and as will hereinafter more fully appear. When said valve VV is closed it is important to have some air supplied to the burner B in order that it may continue to function but at a diminished degree, and in order to take care of this lesser supply required for this purpose a by-pass 104 has been connected to the main air pipe 14 at opposite sides of the valve VV. There is in this by-pass a hand-controlled valve HH which can be adjusted to regulate the area of the passageway through the by-pass. The control mechanism for the valve VV is designated by CM. This control mechanism is illustrated in Figures 12 and 14 and it is shown in section and at enlarged scale in Figures 13 to 15. Figure 13 shows the position which the parts occupy when the valve VV is open, as shown in Figure 12, while Figure 15 shows the position these parts occupy when the valve VV is closed, as shown in Figure 14. This control mechanism includes a cap member 106 that is secured in place on the body casing 107. Said body casing 107 has passageways 108, 109 that communicate with passageway 110 in the cap member 106. The cap member is provided with a suitable packing 111. A member 112 is slidably mounted in the cap member 106. This member 112 has thereupon a valve 113 and may consequently be referred to as an auxiliary valve member. The cap member 106 also carries a perforated spring support or stirrup 114 upon which the lower end of compression spring 115 is seated. The upper end of the spring tends to continuously force the valve 113 against its seat. This valve 113 is normally pressed against its seat with the result that any air flowing through the passageways 108, 109, 110 will not pass to the space 116 at the rear side or larger face of the valve VV but the air can continue to flow through passageways 117, 118, 119, 120 to the atmosphere. In other words, there is a continuous leakage of a small amount only of air directly to the atmosphere; not enough, however, to effect any substantial reduction of the air pressure in the main air pipe. Should the pressure in the boiler rise to the amount predetermined as abnormal, then it is communicated through pipes 121, 122 and 123 to a chamber 100 having at one side thereof the flexible diaphragm 101. This diaphragm 101 is normally pressed upward by compression spring 102 and has connected to it the press-rod 103 which normally allows the auxiliary valve 113 to remain in elevated position but which when depressed engages a pin 124 at the upper end of the member 112 and thereby forces the member 112 downward to the position shown in Figure 15; that is to say, to a position where the passageways 119 are closed and to a position where the valve 113 is open, with the result that the air under pressure can flow through passageways 108, 109 and 110 between the valve 113 and its seat in the space 116 behind the larger or rear face of the differential valve VV; thus effecting a closing of said valve VV.

It will be manifest from the description herein given that the apparatus of the system shown in Figures 11 to 15 not only operates with valve VV open but that when the pressure within the boiler being heated reaches the amount predetermined as abnormal the valve VV is closed so as to in effect throttle the flow of air through the main air pipe 14 and thus cut down the heating effect of the burner.

It will also be manifest that this control is dependent upon a function, to wit, a pressure function, of the apparatus to be heated.

In all the systems herein described it will be observed that the regulation of the pressure in the main air pipe is ahead of the place or places from which the branch pipes 15, 17 and 19 lead from the main air pipe 14.

What I claim is:—

1. A burner comprising in combination a mixing device, a reservoir, an inlet leading from said reservoir to the mixing device, a supply tank, means for conveying oil from said supply tank to said reservoir, the reservoir having an overflow dependent upon which the level of the oil is maintained substantially level with the inlet, an air compressor, a main pipe connecting said compressor and the mixing device, a branch pipe connecting said main pipe with the oil reservoir, another pipe leading from the main pipe to the supply tank, means for varying the air pressure, and a pipe leading back from the reservoir overflow to the supply tank, which burner is characterized by having an outer casing member providing a throat, a movable damper in cooperation with said casing member, and means operatively controlled by the air pressure to regulate the position of the damper; and further characterized by the mixing device being constructed and arranged so that the mixture is delivered in the form of an atomized spray into the throat.

2. A burner comprising in combination a mixing device, a reservoir, an inlet leading from said reservoir to the mixing device, a supply tank, means for conveying oil from said supply tank to said reservoir, the reservoir having an overflow dependent upon which the level of the oil is maintained substantially level with the inlet, a pipe leading back from the reservoir overflow to the supply tank, an air compressor, a main pipe connecting said compressor and the mixing device, a branch pipe connecting said main pipe with the oil reservoir, a branch pipe connecting said main pipe and the supply tank, and means for varying the air pressure in the main pipe, which burner is characterized by having a member providing a restricted throat, a movable damper in cooperation with said member providing the restricted throat, and means operatively controlled by the pressure of the air in the main pipe to regulate the position of said damper, said burner being further characterized by having the mixing device constructed and arranged so that the mixture of air and oil is delivered into the restricted throat.

3. The combination of a mixing device, a reservoir adjoining said mixing device, a communicating conduit, a valve in said conduit, a supply tank, a pump for conveying oil from said tank to said reservoir, an overflow pipe for maintaining the oil level in said reservoir substantially constant and close to the valve in the communicating conduit, which overflow pipe leads back to the tank, an air compressor, a main pipe connecting said compressor and the mixing device, a branch pipe communicating with the main pipe and the oil reservoir, another branch pipe providing communication between the main pipe and the supply tank, and means for varying the air pressure, said apparatus being characterized by having in association with the mixing device at the delivery end thereof a throat member, a damper that controls the flow of air into said throat member, air operated means for positioning said damper, and piping leading to said means from the main air pipe from a point between the pressure varying means and the place where said main air pipe terminates in the mixing device.

4. In means for feeding and burning liquid fuel the combination of a mixing and atomizing device, a conduit for delivering air to said device, a conduit for delivering liquid fuel to said device, an air pump connected with said air conduit, a pump for delivering said fuel through said fuel conduit, valves for regulating the proportion of air and of fuel admitted through said conduits to said device, means for regulating the air pressure, means for automatically controlling the delivery of the fuel by said air pressure to maintain said proportions substantially constant for different pressures, a throat member into which the mixed or atomized air and oil are delivered by said device, a damper between said mixing device and said throat member for regulating the flow of air into the throat member, air operated means for positioning said damper, and piping leading from the air conduit to said air operated means.

5. In means for feeding and burning liquid fuel the combination of a mixing device and atomizing device, a conduit for delivering air to said device, a conduit for delivering liquid fuel to said device, an air pump connected with said air conduit, a pump for delivering said fuel through said fuel conduit, means for regulating the proportion of air and of fuel admitted through said conduits to said device and for maintaining said proportion constant for varying air pressures, a throat member into which the mixed or atomized fuel and air are delivered by said device, a damper for regulating the flow of air from the outside into the throat member, air controlled means for positioning said damper, and air piping leading from the air conduit to said air controlled means.

6. In a means for feeding liquid fuel the combination of an ejector tube, a reservoir, an inlet from said reservoir to the ejector tube, a supply tank, means for conveying the fuel from said tank to said reservoir, an overflow tube substantially level with said inlet, an air compressor, an air conduit outside said ejector tube delivering air at the mouth of said tube, a main air pipe connecting said compressor and the air conduit, a branch pipe connecting said main air pipe with the fuel reservoir, another pipe leading to the supply tank, means for regulating the air pressure, a throat member into which said ejector tube and said air conduit deliver mixed air and atomized fuel, a damper controlling the flow of induced air into said throat member, a piston connected to the damper for operating the same, a cylinder in which the piston operates, and an air pipe leading from said conduit to said cylinder whereby the air can effect the movement of the piston.

7. In a means for burning liquid fuel the combination of an ejector tube, a reservoir, an inlet from said reservoir to the ejector tube, a supply tank, means for conveying the fuel from said tank to said reservoir, said reservoir having an overflow substantially level with said inlet, means for conveying back to the supply tank the fuel that overflows, an air compressor, an air conduit surrounding said ejector tube and delivering air at the mouth of said tube, a main air pipe connecting said compressor and said air conduit, a branch pipe connecting said main air pipe with the fuel reservoir, another pipe leading to the supply tank, a throat member into which the ejector tube and surrounding air conduit deliver mixed fuel and air, a damper for controlling the flow of air from the outside into said throat member, means for positioning the damper, and an air pipe leading from the main air pipe to said means whereby the pressure of the air within the main air pipe controls the positioning of the damper.

8. In an apparatus for burning liquid fuel the combination of a conduit for delivering air, a conduit for delivering liquid fuel, an air pump connected to said air conduit, a pump for delivering said fuel, valves for regulating the proportions of air and fuel admitted to said conduits, means for regulating the air pressure, and means for automatically controlling the delivery of the fuel by said air pressure to maintain said proportions substantially constant for different air pressures, and in association with the elements above defined a throat member into which the air and fuel from said conduits are delivered, a damper for controlling the flow of induced air into said throat member, and air controlled means for positioning said damper, which air controlled means is dependent for its operation upon the pressure of the air in the air conduit.

9. In an apparatus for burning fuel the combination of a conduit for delivering air, a conduit for delivering fuel, means for causing air and fuel to flow into and through said conduits, means for regulating the proportion of air and fuel flowing through said conduits, and means for automatically maintaining said proportion substantially constant, and in association with the elements above defined a throat member into which the air and fuel from said conduits are delivered, a damper for controlling the flow of induced air into said throat member, and air controlled means for positioning said damper, which air controlled means is dependent for its operation upon the air flowing through the air conduit.

10. In a device for burning liquid fuel the combination of an ejector tube, a reservoir adjoining said tube, a communicating conduit, an adjustable valve in said conduit, a supply tank, means for conveying fuel from said tank to said reservoir, an overflow pipe for maintaining the liquid fuel level in said reservoir substantially constant and close to the valve in the communicating conduit, an air compressor, an air conduit delivering air close to the mouth of said ejector tube, a main air pipe connecting said compressor and the air conduit, a branch pipe communicating with said main air pipe and the fuel reservoir, another branch pipe between the main air pipe and the supply tank, a throat member into which mixed fuel and air delivered from the ejector tube and the air conduit are delivered, a damper for controlling the flow of air into and through the throat member which air unites with the mixed fuel and air to support combustion, air operated means for positioning said damper, and a pipe leading from the main air pipe to said last-mentioned means.

11. In a device for burning liquid fuel the combination of an ejector tube, a reservoir adjoining said tube, a communicating conduit, a supply tank, a pump for conveying fuel from said tank to said reservoir, an overflow pipe for maintaining the liquid fuel level in said reservoir substantially constant and close to the entrance end of the ejector tube, which overflow pipe returns to the supply tank, an air compressor, an air conduit delivering air close to the mouth of said ejector tube, a main air pipe connecting said compressor and the air conduit, a branch pipe communicating with said main air pipe and the fuel reservoir, another branch pipe between the main air pipe and the supply tank, means for regulating the air pressure, a throat member into which mixed fuel and air delivered from the ejector tube and the air conduit are delivered, a damper for controlling the flow of air into the throat member, which air unites with the mixed air and fuel to support combustion, air controlled means for positioning said damper, and a pipe leading from the main air pipe to said last-mentioned means.

12. A means for feeding and burning a liquid combustible comprising the combination of an ejector tube having an inlet, means for delivering said combustible against a negligibly low hydrostatic head so close to the inlet of said tube that fluctuations of delivery due to friction and inertia are substantially absent, a conduit delivering air under pressure, means for introducing a combustible into the ejector tube at a pressure bearing such relation to the air pressure as to maintain the combustible at a predetermined quantity of ratio to the air for different air pressures, means for regulating the air pressure, a throat member into and through which mixed air and combustible enter and flow, a damper associated with said throat member for regulating the flow of air into said throat member, means for positioning said damper, and piping leading from the air conduit to said means whereby the position of the damper is dependent upon the pressure within the air conduit.

13. A means for feeding and burning a liquid combustible comprising the combination of an ejector tube having an inlet, means for delivering said combustible against a negligibly low hydrostatic head so close to the inlet of said tube that fluctuations of delivery due to friction and inertia are substantially absent, a conduit through which air is delivered at the end of said ejector tube, means whereby a combustible passes into the ejector tube under conditions whereby the pressure of the combustible bears such relation to the pressure of the air as to maintain a predetermined ratio of the combustion and air even for different air pressures, a throat member into and through which the mixed air and combustible enter and flow, a damper associated with said throat member for regulating the flow of induced air into said throat member, means for positioning said damper, and means whereby the position of the damper is a function of the pressure of air flowing through the air conduit.

14. The combination in a burner of a mixing device having conduits for conveying, respectively, air under pressure and a liquid combustible thereto, means for varying the air pressure, means for predetermining the proportion of air and combustible admitted by said mixing device, and means for automatically controlling the delivery of the combustible to the mixing device to maintain said proportion substantially constant for different air pressures, and in association with the mixing device of a throat member into which the mixed air and combustible are delivered, a damper for controlling the flow of air from the outside into the throat member, and means whereby the position of the damper is dependent upon the pressure of the air flowing to the mixing device.

15. A mixing device having conduits for conveying air under pressure and oil thereto, means for varying the air pressure, means for predetermining the proportion of air and oil admitted by said mixing device for a given air pressure, and means for automatically controlling the delivery of the oil to the mixing device by the air pressure to maintain said proportion substantially constant for different air pressures, and in combination therewith a throat member into which the mixed air and oil are delivered by said mixing device, a damper for regulating the flow of air from the outside into said throat whereby the proper amount of air and mixture can unite to form complete combustion, and means whereby the damper is definitely positioned for each definite air pressure.

16. The combination of a mixing device having inlets for air and oil, means for delivering oil against a negligibly low hydrostatic head to the oil inlet of said device, means for introducing air under pressure to said device, means for introducing said oil at a predetermined and maintained ratio to the air into said device, and a conduit for conducting away the resulting mixture, which conduit comprises and is in part provided by a throat member, there being in combination with said throat member and said mixing device a damper which is operatively arranged with respect to the throat member whereby the flow of air into the throat member is controlled, positioning means for controlling the position of the damper, which positioning means is in communication with the means for introducing air to the mixing device in a manner whereby dependent upon the pressure of the air flowing to the mixing device the position of the damper is determined.

17. In a mixing and burning device the combination of a mixing device having inlets for air and oil, means for delivering air under pressure to the air inlet, means for delivering oil against a negligibly low hydrostatic head so close to the oil inlet of said device that the fluctuations of delivery due to friction and inertia are substantially absent, means for introducing said oil into the mixing device at a pressure bearing such relation to the air pressure as to maintain the oil at a predetermined quantitative ratio to the air, and means for varying the air pressure, and in association with said mixing device of means for conducting away the resulting mixture, which last-mentioned means comprises a throat member having a damper in association therewith, of air controlled means for positioning the damper, and of a pipe leading from the air supply of the mixing device to said air controlled means for positioning the damper.

18. A system wherein a member is heated by a burner and which system includes in combination an air compressor, a fuel supply tank, an air and fuel mixing device constituting a part of the burner, a piping for conducting air from the air compressor to the mixing device, piping for supplying fuel from the supply tank to the mixing device, which mixing device is constructed and connected in the system so that a predetermined proportion of the air and fuel delivered from the mixing device can be maintained even under varying pressures of air supplied thereto, a throat member constituting a part of the burner and into which the mixed air and fuel are delivered, means for regulating the induction of air from the outside into the throat member, which induced air thus supplied is employed in supporting the combustion of the mixture, the operation of said last-mentioned means being dependent upon the pressure of the air supply through the piping for conducting air to the mixing device, a valve for automatically varying the pressure of the air in said last-mentioned piping, and valve controlling means cooperatively related with said valve and dependent for its operation upon a function of the member heated by the burner.

19. A system wherein a boiler or member having a pressure function is heated by a burner and which system includes in combination an air compressor, a closed fuel supply tank, a burner having a mixing device provided with a main air pipe for conducting air from the air compressor to the mixing device, and an oil pipe for conveying the fuel from the supply tank to a closed oil reservoir of the mixing device, said system having branch pipes extending from the main air pipe to the closed fuel supply tank and the oil reservoir, said system also having an overflow pipe extending from the oil reservoir back to the supply tank, the construction of the mixing device being such that a predetermined proportion of air and fuel delivered from the mixing device can be maintained even under varying pressures of air supplied to the mixing device, said burner having a throat member into which the mixed air and fuel from the mixing device is delivered, the burner also having means providing a damper for regulating the flow of air from the outside into the throat member, the operation of said last-mentioned means being dependent upon the pressure of the air in said main air pipe, the system also having a valve for automatically varying the pressure of the air in said main air pipe, and valve-controlling means cooperatively related with said valve and dependent for its functioning upon certain changes in pressure within the boiler.

20. A system including in combination a member or part as a furnace or the like, a burner for heating the same, which burner includes a mixing device wherein air and fuel can be mixed in a maintained proportion even under varying conditions of the pressure of the air supplied to the mixing device, an air compressor, piping leading therefrom to the mixing device, a closed fuel supply tank, there being a closed fuel supply reservoir arranged adjacent to and in communication with a fuel passageway or conduit in said mixing device, a branch pipe leading from the main air pipe to a chamber in the closed space above the reservoir, a second branch pipe leading from the main air pipe to the closed fuel supply tank, an overflow pipe leading from the reservoir back to the supply tank, said burner having a throat member into which the mixed air and fuel from the mixing device is delivered, a damper for regulating the area of an opening through which induced air flows into the throat member and to a position where the air unites with the mixture delivered into the throat member, means for positioning the damper, and a branch pipe extending from the main air pipe to said means whereby the position of the damper is dependent upon the pressure of the air in said main air pipe, a valve for effecting a variation in pressure of the air in the main air pipe, means for controlling the operating of said valve, which last-mentioned means is under control of means associated with the member or part heated by the burner.

21. A system wherein a member is heated by a burner that includes a mixing device, which system comprises in combination the mixing device that mixes air and fuel delivered thereto, an air compressor, a main air pipe leading from the compressor to the mixing device, a fuel supply tank, piping for conducting fuel from the fuel supply tank to the mixing device, a throat member into which the mixed air and fuel from the mixing device are delivered, the construction being such that air can be induced from the outside into the throat member where it can unite with the mixture from the mixing device, a damper for regulating the area of the opening through which the induced air flows into the throat member, means for positioning said damper, the operation of which means is dependent upon the pressure of the air in the main air pipe, a valve for varying the pressure of the air in said main air pipe, and valve controlling means associated with said valve, which valve controlling means is dependent for its operation upon a function resulting from the member being heated by the combustion resulting from the uniting of said mixture from the mixing device and the air which passed from the outside into the throat member.

22. A system wherein a member or part is heated, which system includes in combination and in associated relationship a mixing device for mixing air and liquid fuel, an air compressor, a main air pipe leading from the air compressor to the mixing device, a fuel supply tank, piping for conducting the liquid fuel from the fuel supply tank to the mixing device, a branch pipe leading from the main air pipe to the supply tank, an overflow pipe leading from the mixing device back to the supply tank, a throat member into which the mixed air and fuel from the mixing device are delivered, the construction being such that air can be induced from the outside into the throat member through an opening the area of which is regulated by a damper; means for positioning said damper, a branch pipe extending from said main air pipe to said means whereby the operation thereof is according to the pressure of the air in the main air pipe, a valve for varying the pressure of the air in said main air pipe, and valve controlling means associated with said valve, which valve-controlling means is dependent for its operation upon a function of the member or part heated by the combustion of the mixture of air and fuel from the mixing device and which combustion receives support from the air passing into the throat member through said damper regulated opening.

23. A system including in combination a member heated by the functioning of a burner including a device for mixing air and oil thereto, an air compressor, a main air pipe leading from the compressor to the mixing device, a fuel supply tank, an oil piping leading from the fuel supply tank to the mixing device, a throat member into which the mixed air and oil from the mixing device are delivered, the construction being such that air can be induced from the outside into the throat member in a position where it unites with the mixture from the mixing device, a damper for regulating the area of the opening through which the induced air flows into the throat member, means for positioning said damper, the operation of which means is dependent upon the pressure of the air in the main air pipe, a valve for varying the pressure of the air in said main air pipe, and valve controlling means associated with said valve, which valve controlling means is dependent for its operation upon a function resulting from the member when heated by the burner.

This specification signed the 17" day of March, A. D. 1921.

WALTER C. DAYTON.